Patented Jan. 28, 1936

2,028,958

UNITED STATES PATENT OFFICE 2,028,958

MANUFACTURE OF AZO COLORS

James D. Todd, Laurence E. May, and William L. Newbury, Chicago, Ill., assignors to The Sherwin-Williams Company, Chicago, Ill., a corporation of Ohio No Drawing. Application April 26, 1933, Serial No. 668,030

7 Claims. (Cl. 260—44.6)

The present invention relates to the manufacture of an azo dye, and particularly pigments. It has special reference to improving the color value, both in hue and tinctorial power, and to improving the physical form of pigments for incorporation and use in vehicles, as varnishes, oils, lacquers, rubber, resins, and the like.

It has heretofore been attempted to increase certain valuable qualities of dyestuff pigments by increasing the dispersing qualities through the addition of certain dispersing agents such as Turkey red oil, resin and others. There are certain disadvantages in these materials. For example these have a diluting effect, inhibit drying, increase bleeding and retard wetting of the pigment by a vehicle during the incorporation process. The present process aims to secure advantages of the above agents and gives better effects than these addition products without any of the attendant disadvantages.

The object of the present invention is to produce an azo dyestuff by the usual diazotizing and coupling process, and to effect the coupling in the presence of 1-phenyl-3-methyl-pyrazolone.

Another object is the formation of an insoluble or pigment form of such an azo color coupled in the presence of phenyl-methyl-pyrazolone.

A specific object of the invention is the formation of an azo dyestuff from Tobias acid coupled in diazotized form with beta naphthol in the presence of 1-phenyl-3-methyl-pyrazolone.

A further object is the provision of a paint, enamel, ink, lacquer, rubber, resin or other composition, incorporating a pigment made from such an azo dye coupled in the presence of phenyl-methyl-pyrazolone.

Other and ancillary objects and advantages of the invention will be apparent from the following description and explanation of the invention in which illustrative examples are given, having the preferred materials and procedure through which the advantages are clearly exhibited.

A large number of amino compounds are available for diazotization followed by coupling with one or more intermediate bases to form dyestuffs. As is well known, the color and character of the dyestuff obtained are determined by the choice of components. It is also well known that the quality and tinctorial and physical character are also determined by the procedure of coupling and the composition of the solution in which coupling is effected.

We have taken advantage of this knowledge by finding an agent which advantageously affects the product in desired particulars, and use that agent as an essential component in the coupling mixture when diazotized Tobias acid is coupled with beta-naphthol. The agent is specifically phenyl-methyl-pyrazolone. The quantity may vary over a wide range.

The resulting dyestuff forms pigments capable of incorporation into a vehicle for making paints, varnishes, lacquers, inks, and the like.

Example

Tobias acid (2-naphthylamine-1-sulphonic acid) is one amine suitable for coupling with beta-naphthol to produce a pigment-forming dyestuff. Diazotization may be effected in the usual way, for example, by first forming its sodium salt, thus to have it effectively all dissolved. To 111.5 parts of Tobias acid there may be used 22 parts of caustic soda. The solution of sodium salt thus formed may be diazotized by use of 35 parts of sodium nitrite and 171 parts of hydrochloric acid solution of 18° Bé. strength. Ordinarily this is carried out in the cold by adding the sodium nitrite to the acidified amine. Of course the diazotization process may be varied as is well known in the art.

The coupling solution may be prepared by placing 50 parts of sodium carbonate in 4500 parts of water, and adding to it a solution containing 69.3 parts of beta-naphthol, 4.4 parts of phenyl-methyl-pyrazolone and 3.2 parts of sodium hydroxide, and sufficient water to effect solution. The coupling bath is adjusted to a suitable temperature, such as 22° C.

To this the normally colder suspension of diazotized amine is added. Coupling proceeds quickly and automatically by reason of the inherent reactivity of the two liquid mixtures. There is formed a sodium salt of a dyestuff in practically insoluble form, which may or may not be filtered. If filtered, the salt is sludged in 3000 parts of water. In either case, the volume is increased to 10500 parts by adding water. To this is added a solution having a metal ion capable of forming more insoluble pigment salt, such as the barium or calcium ion. Where barium is employed, a solution of 75 parts of barium chloride in 750 parts of water may be used. Where the calcium pigment is desired, a precipitant solution of 51 parts of calcium chloride in 510 parts of water is suitable. Other metallic salt in equivalent molecular proportion may be substituted.

In effecting precipitation of the pigment the precipitant solution is added and the temperature of the mixture increased, for example to the boiling point, where it may be maintained for a short time, such as 10 minutes. The pigment, thus suitably formed, is filtered, washed, dried and ground, if the dry form is desired.

The barium toner formed as above described has a high tinting strength, being apparently more highly dispersed or dispersible. It is from 10% to 30% stronger than the product made in the absence of phenyl-methyl-pyrazolone. To test the color values for comparison, an ink may be drawn down on paper, wiping one portion to a thin film on the surface of the paper, and leaving another portion with a thicker film of the ink on the paper. The wiped portion by reflection exhibits the so-called print shade, and by transmission the so-called undertone. The thicker film exhibits by reflection the so-called mass tone. Using an ink with the barium toner, the mass tone is deeper and much brighter than with an ink similarly made without the use of this invention. The print shade is more brilliant with a characteristically different bronze appearance. The undertone is extremely transparent with a yellower cast, which is a property frequently desired. Inks formed by use of lithograph varnish have exceptionally fine working qualities and possess a considerably lower oil absorption than inks having the usual dispersing agents above referred to.

Other examples showing various quantities of the new agent might be given, but these add nothing not generally disclosed relative to the invention. The new agent may be used either in neutral, alkaline or acid coupling baths, according to the character of dyestuff being made, these conditions of the bath being well known to those skilled in the art.

No attempt is made to explain the nature of what takes place, but it has been well established that the presence of phenyl-methyl-pyrazolone in the coupling mixture is beneficial in forming a dyestuff of different characteristics and of new and improved color and qualities. Generally the colors are from 10% to 30% stronger. It can readily be seen that the tinctorial strength, especially when the pigment is used for printing inks or tints, is so much greater that it permits of an increased amount of less costly inerts to be used, or a proportionately smaller amount of color to be used to produce the same effect. The improvements resulting from the present invention are exhibited in the more concentrated forms by new and different shades, and in the more distended forms also by new shades, and by greater strength per unit weight. The results are obtained with small amounts as well as with large amounts of of phenyl-methyl-pyrazolone, such as ½% or 25%, based on the weight of beta-naphthol equivalent of the particular coupling agent used. These amounts are not set forth as critical limits of the invention. Therefore the invention is not considered as limited to any small or any large amount of phenyl-methyl-pyrazolone.

The precise step upon which the invention is founded takes place in the coupling action, and therefore its effect resides in the immediate product of coupling. The improvement appears to be latent in part and is most patent when a pigment has been formed and the pigment distended as by formation of an enamel or ink. The more concentrated forms of the product embodying the improvement, such as the azo dyestuff, any soluble salts, or solutions, or an insoluble dry pigment form give but little, if any, indication of the full value of the improvements above referred to.

Accordingly, since the dyestuff itself incorporates the improvement in latent form, and in a vehicle the composition incorporates it in patent form, it is considered that the latent and patent forms, and all the intervening forms fall within the scope of the invention.

It has not been deemed necessary to describe the incorporation of the pigment forms in oils, varnish, lacquer, rubber, resins, or like vehicles for making paints, enamels, lacquers, inks, and the like. Any of the well known procedures of the prior art may be used.

In our copending joint application Serial No. 668,031, filed April 26, 1933, concurrently herewith, we describe another method of securing similar advantages, by having present in the coupling mass, a minor quantity of a diazotized amine in addition to and foreign to the principal amine. The present invention may be used in conjunction with the invention of said application, and in particular that part of it wherein the use of a foreign amine is described in reference to a dyestuff formed from Tobias acid and beta-naphthol.

It is to be understood that the invention is not limited specifically to the methods and quantities herein given by way of illustration, so long as there is present during the coupling reaction in the manufacture of the said azo dyestuff a quantity of phenyl-methyl-pyrazolone, in accordance with the invention as expressed in the appended claims.

We claim:

1. The method of making an azo dyestuff which comprises coupling diazotized Tobias acid with beta naphthol in the presence of a third substance in the form of a quantity of phenyl-methyl-pyrazolone up to 25% by weight of the beta-naphthol.

2. The method of forming an improved azo dyestuff pigment which comprises coupling diazotized Tobias acid with the beta naphthol in the presence of a third substance in the form of phenyl-methyl-pyrazolone, and forming an insoluble pigment in the form of an insoluble metal salt of the resulting dyestuff.

3. The method of forming an azo dyestuff which comprises diazotizing Tobias acid, and coupling the product with beta-naphthol in the presence of phenyl-methyl-pyrazolone.

4. A pigment composition suitable for paint, enamel, lacquer, ink, and the like, comprising an insoluble pigment in the form of an insoluble metal salt of the dyestuff formed by coupling Tobias acid in diazonium form with beta-naphthol in the presence of phenyl-methyl-pyrazolone, and a vehicle incorporating said pigment salt in dispersed form.

5. A pigment comprising an insoluble metal salt of an azo dyestuff consisting of the dyestuff product formed by coupling diazotized Tobias acid and beta naphthol in the presence of phenyl-methyl-pyrazolone.

6. A pigment comprising a barium salt of an azo dyestuff consisting of the dyestuff product formed by coupling diazotized Tobias acid and beta naphthol in the presence of phenyl-methyl-pyrazolone.

7. A pigment coating composition suitable for paint, enamel, lacquer, ink and the like, comprising a pigment in the form of an insoluble metal salt of a dyestuff formed by coupling diazotized Tobias acid with beta naphthol in the presence of phenyl-methyl-pyrazolone, and a vehicle incorporating said pigment salt in dispersed form.

JAMES D. TODD.
LAURENCE E. MAY.
WILLIAM L. NEWBURY.